US011727406B2

(12) United States Patent
Hearty et al.

(10) Patent No.: US 11,727,406 B2
(45) Date of Patent: Aug. 15, 2023

(54) DETERMINING A FRAUD RISK SCORE ASSOCIATED WITH A TRANSACTION

(71) Applicant: MASTERCARD TECHNOLOGIES CANADA ULC, Vancouver (CA)

(72) Inventors: John Hearty, Vancouver (CA); Anton Laptiev, Vancouver (CA); Parin Prashant Shah, Vancouver (CA); Sik Suen Chan, Richmond (CA); Hanhan Wu, Surrey (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 16/988,142

(22) Filed: Aug. 7, 2020

(65) Prior Publication Data

US 2021/0042757 A1 Feb. 11, 2021

Related U.S. Application Data

(60) Provisional application No. 62/885,123, filed on Aug. 9, 2019.

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC ................................................ G06Q 20/4016
See application file for complete search history.

(56) References Cited

U.S. PATENT DOCUMENTS

2017/0178134 A1* 6/2017 Senci ................. G06Q 20/4016
2018/0191762 A1* 7/2018 Bailey ................. H04L 63/1466
(Continued)

FOREIGN PATENT DOCUMENTS

CH 715150 A2 * 1/2020

OTHER PUBLICATIONS

"Ghosh and Reilly, Credit Card Fraud Detection with a Neural-Network, Apr. 11, 2011, IEEE, entire document" (Year: 2011).*
(Continued)

*Primary Examiner* — Abhishek Vyas
*Assistant Examiner* — Adam Hilmantel
(74) *Attorney, Agent, or Firm* — Michael Best & Friedrich LLP

(57) ABSTRACT

A system for determining a fraud risk score associated with a transaction. The system includes a server including an electronic processor. The electronic processor is configured to determine a plurality of rules based on a plurality of transactions over time and extract one or more features of the transaction. The electronic processor is also configured to select, based on the plurality of rules, a plurality of fraud risk features Each non-categorical fraud risk feature selected is associated with a fraud risk feature value and each categorical fraud risk feature selected is associated with a categorical variable value. The electronic processor is configured to determine, for each categorical fraud risk feature, a fraud risk feature value. The electronic processor is also configured to determine the fraud risk score based on the one or more of the transformed fraud risk feature values.

18 Claims, 4 Drawing Sheets

(56) References Cited

U.S. PATENT DOCUMENTS

| | | | |
|---|---|---|---|
| 2019/0188593 A1* | 6/2019 | Wang | G06Q 30/0248 |
| 2019/0220863 A1* | 7/2019 | Novick | G06Q 20/10 |
| 2020/0143376 A1* | 5/2020 | Manoharan | G06Q 20/4016 |
| 2020/0286095 A1* | 9/2020 | Anunciacao | G06F 18/245 |
| 2020/0349575 A1* | 11/2020 | Karmakar | G06F 17/15 |

OTHER PUBLICATIONS

International Search Report and Written Opinion for Application No. PCT/CA2020/051082 dated Nov. 4, 2020 (10 pages).

\* cited by examiner

DETERMINING A FRAUD RISK SCORE ASSOCIATED WITH A TRANSACTION

RELATED APPLICATIONS

This application claims priority to U.S. Provisional Patent Application No. 62/885,123, filed Aug. 9, 2019, the entire content of which is hereby incorporated by reference.

BACKGROUND

Preventing identity fraud is a major area of attention for merchants and financial institutions. It is estimated there were more than sixteen million victims of identity fraud in 2017, with $16.8 billion in losses attributed to identity theft alone. More than a million fraud-related incidents were reported in 2017. Credit card fraud was also the most reported form of identity theft with over one hundred and thirty thousand reports in 2017. More concerning, it is estimated that more than fifty-eight million records have been exposed between January and November of 2018. Thus, there is a need for solutions which detect fraud and verify digital identity in online transactions.

SUMMARY

Embodiments described herein provide a system and a method for determining a fraud risk score associated with a transaction using a rules based approach enhanced with statistical techniques. A transaction involves user device requesting to transfer funds included in an account to another account or a destination. The system and method described herein use one or more features which are captured and in real-time. The system and method described herein also use a preprocessor (described below as feature transformer software) which performs feature selection and feature encoding techniques to best utilize available features.

Existing systems for determining a fraud risk score associated with a transaction use an unenhanced rules-based approach to determine a fraud risk score associated with a transaction. An unenhanced or conventional rules-based approach leverages a set of individually simple decision rules which are organized semi-hierarchically. Some rules depend on contextual information calculated when other rules are executed. Therefore, scheduling a ruleset (determining which rules to execute at which time) is complex and takes up to tens of milliseconds.

In contrast, embodiments herein describe an enhanced rules-based approach for determining a fraud risk score. Unlike conventional rules-based approaches, the enhanced rules-based approach described herein uses parallelizable statistical functions or equations in coordination with one or more rules to select one or more feature to use to determine a fraud risk score. Because they are parallelizable, the statistical functions may all be executed simultaneously if desired and a result may be computed in under 1 millisecond. Thus, the embodiments described herein provide an approach to determining a fraud risk score that is faster and requires less processing power than conventional rules-based approaches.

The embodiments described herein also provide an approach to determining a fraud risk score that is more accurate than conventional rules-based approaches. There exist statistical techniques for tuning the parameters of a statistical equation, including classical machine learning techniques such as backpropagation or hyperparameter optimization. The parameters of a statistical equation may be readily tuned because the number of elements to be tuned in a statistical equation is not unduly large and the field of machine learning has worked to optimize such problems.

In contrast, in tuning conventional rules-based approaches, the values of every rule are tuned and every rule impacts every other rule. Given a large number of rules, this approach quickly becomes computationally challenging, making tuning via reliable statistical methods far more tractable. Because tuning influences the accuracy of output, the embodiments described herein that utilize tunable statistical equations in the manner discussed herein provide greater accuracy than conventional rule-based approaches.

One embodiment provides a system for determining a fraud risk score associated with a transaction. The system includes a server including an electronic processor. The electronic processor is configured to determine a plurality of rules based on a plurality of transactions over time and extract one or more features of the transaction. The electronic processor is also configured to select, based on the plurality of rules, a plurality of fraud risk features from the one or more extracted features. The plurality of fraud risk features include at least one selected from the group comprising a non-categorical fraud risk feature and a categorical fraud risk feature. Each non-categorical fraud risk feature of the plurality of fraud risk features is associated with a fraud risk feature value and each categorical fraud risk feature of the plurality of fraud risk features is associated with a categorical variable value. The electronic processor is also configured to determine, for each categorical fraud risk feature of the plurality of fraud risk features, a fraud risk feature value by transforming the categorical variable value associated with the categorical fraud risk feature using feature encoding, The electronic processor is also configured to determine an outlying fraud risk feature value of the fraud risk feature values associated with the plurality of fraud risk features. The electronic processor is further configured to transform one or more fraud risk feature values of the plurality of fraud risk features based on one or more of feature encoding, scaling, and standardization, the one or more feature values including the outlying fraud risk feature value. The electronic processor is also configured to determine the fraud risk score based on the one or more of the transformed fraud risk feature values.

Another embodiment provides a method of determining a fraud risk score associated with a transaction. The method includes determining a plurality of rules based on a plurality of transactions over time and extracting one or more features of the transaction. The method also includes selecting, based on the plurality of rules, a plurality of fraud risk features from the one or more extracted features. The plurality of fraud risk features include at least one selected from the group comprising a non-categorical fraud risk feature and a categorical fraud risk feature. Each non-categorical fraud risk feature of the plurality of fraud risk features is associated with a fraud risk feature value and each categorical fraud risk feature of the plurality of fraud risk features is associated with a categorical variable value. The method also includes determining, for each categorical fraud risk feature of the plurality of fraud risk features, a fraud risk feature value by transforming the categorical variable value associated with the categorical fraud risk feature using feature encoding. The method also include determining an outlying fraud risk feature value of the fraud risk feature values associated with the plurality of fraud risk features and transforming one or more fraud risk feature values of the plurality of fraud risk features based on one or more of feature encoding, scaling, and standardization, the one or more fraud risk feature values including the outlying fraud risk feature value. The method further includes determining the fraud risk score based on the one or more of the transformed fraud risk feature values.

A non-transitory computer-readable medium with computer-executable instructions stored thereon executed by an electronic processor included in a server to perform a method of determining a fraud risk score associated with a transaction. The method includes determining a plurality of rules based on a plurality of transactions over time and extracting one or more features of the transaction. The method also includes selecting, based on the plurality of rules, a plurality of fraud risk features from the one or more extracted features. The plurality of fraud risk features include at least one selected from the group comprising a non-categorical fraud risk feature and a categorical fraud risk feature. Each non-categorical fraud risk feature of the plurality of fraud risk features is associated with a fraud risk feature value and each categorical fraud risk feature of the plurality of fraud risk features is associated with a categorical variable value. The method also includes determining, for each categorical fraud risk feature of the plurality of fraud risk features, a fraud risk feature value by transforming the categorical variable value associated with the categorical fraud risk feature using feature encoding. The method also include determining an outlying fraud risk feature value of the fraud risk feature values associated with the plurality of fraud risk features and transforming one or more fraud risk feature values of the plurality of fraud risk features based on one or more of feature encoding, scaling, and standardization, the one or more fraud risk feature values including the outlying fraud risk feature value. The method further includes determining the fraud risk score based on the one or more of the transformed fraud risk feature values.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
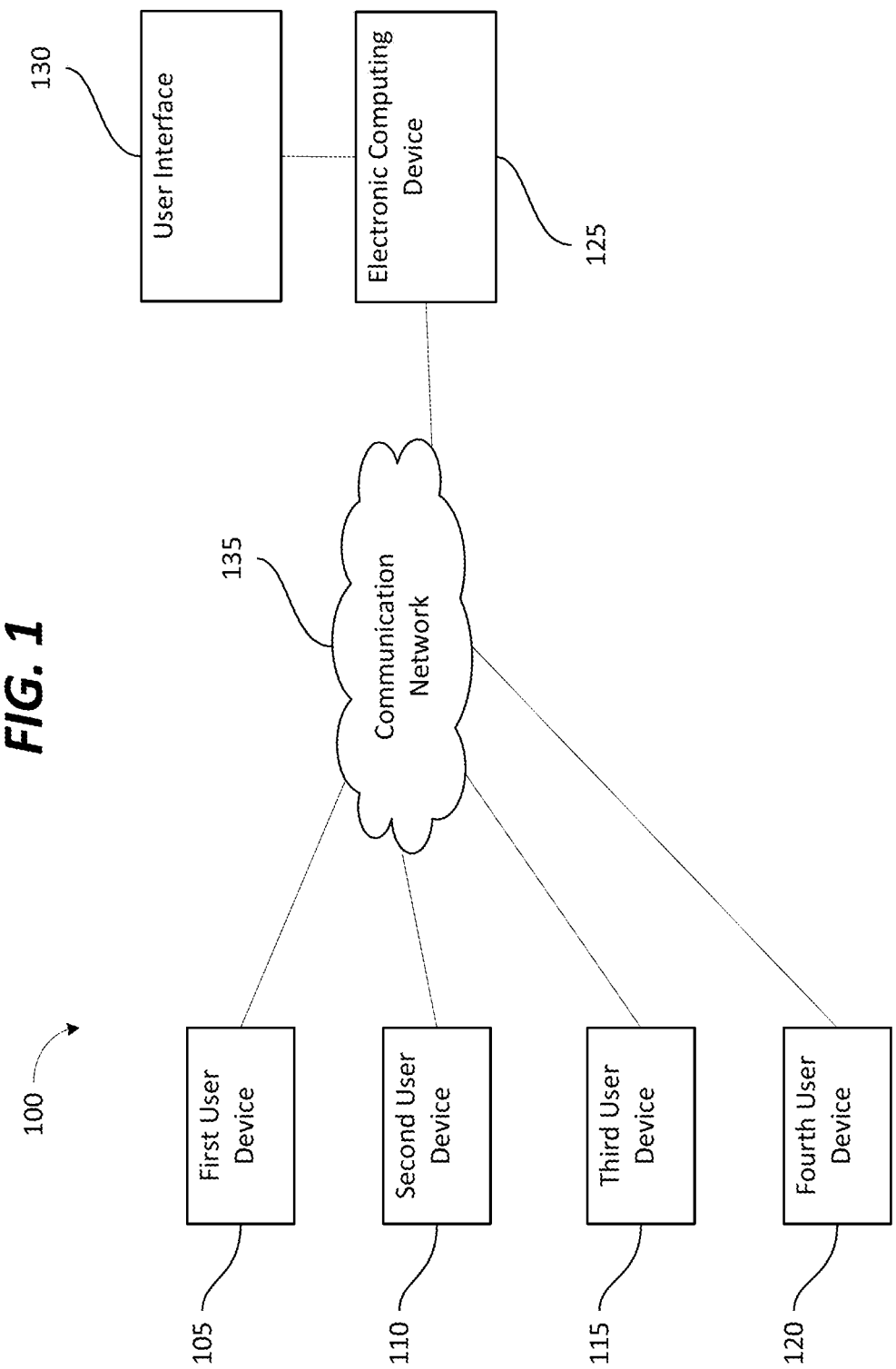
FIG. 1 is a block diagram of a system for determining a fraud risk score associated with a transaction in accordance with some embodiments.

FIG. 1 is a block diagram of a system 100 for determining a fraud risk score associated with a transaction. In the example shown, the system 100 includes a first user device 105, a second user device 110, a third user device 115, and a fourth user device 120 (referred to herein collectively as the user devices 105, 110, 115, 120), a server 125, and a server-side user interface 130 (e.g., a workstation). The server 125 and the user interface 130 communicate wirelessly, over one or more communication lines or buses, or a combination thereof. The server 125 and user devices 105, 110, 115, 120 are communicatively coupled via a communication network 135. The communication network 135 is an electronic communications network including wireless and wired connections. The communication network 135 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and that the four user devices 105, 110, 115, 120 included in FIG. 1 are purely for illustrative purposes. It should also be understood that the system 100 may include a different number of electronic computing devices than the number of electronic computing devices illustrated in FIG. 1 and the functionality described herein as being performed by the server 125 may be performed by a plurality of electronic computing devices. It should be understood that some of the functionality described herein as being performed by the server 125 may be performed by a user device.

In the embodiment illustrated in FIG. 1, the server 125 is, for example, a server that is configured to authenticate a user. In the embodiment illustrated in FIG. 1, the user devices 105, 110, 115, 120 are electronic computing devices (for example, any one of a smart telephone, a laptop computer, a desktop computer, a smart wearable, a smart appliance, a smart home assistant, or other type of electronic computing device configured to operate as described herein).

Each of the user devices 105, 110, 115, 120 are configured to communicatively connect to the server 125 through the network 135 and provide information (transaction data) to the server 125 when a transaction is initiated by one of the user devices 105, 110, 115, 120. Transaction data includes, for example, an IP address, a location of the user device, specific operation information, timing information, network information, other suitable transaction data, or a combination thereof. In some embodiments, transaction data received from the user devices 105, 110, 115, 120 at the server 125 may be stored in a database connected to the server 125 via the communication network 135.

The user interface 130 includes a combination of digital and analog input or output devices required to achieve a desired level of control and monitoring of the system 100. For example, the user interface 130 includes a display (e.g., a primary display, a secondary display, etc.) and input devices such as a mouse, touch-screen displays, a plurality of knobs, dials, switches, buttons, or other suitable input device. The display is, for example, a liquid crystal display ("LCD"), a light-emitting diode ("LED") display, an organic LED ("OLED") display, or other suitable display.

Figure 2:
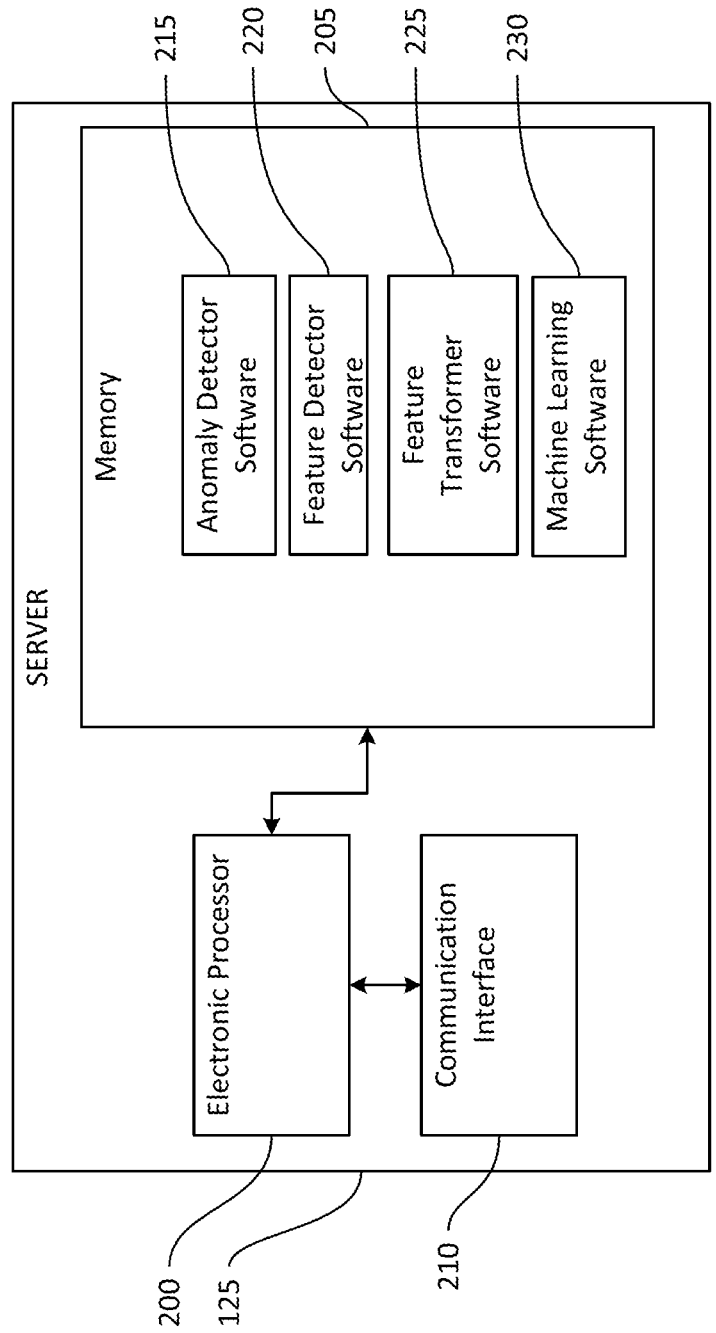
FIG. 2 is a block diagram of a server of the system of FIG. 1 in accordance with some embodiments.

FIG. 2 is a block diagram of an example of the server 125. As illustrated in FIG. 2, the server 125 includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 135 and, optionally, one or more additional communication networks or connections. The communication interface 210 allows the server 125 to communicate with the user devices 105, 110, 115, 120 over the communication network(s) 135. The electronic processor 200, the memory 205, and the communication interface 210 communicate wirelessly, over one or more communication lines or buses, or a combination thereof. It should be understood that the server 125 may include additional components than those illustrated in FIG. 2 in various configurations and may perform additional functionality than the functionality described herein.

As illustrated in FIG. 2, the memory 205 included in the server 125 includes anomaly detector software 215, feature generator software 220, feature transformer software 225, and machine learning software 230. It should be understood that, in some embodiments, the memory 205 includes components other than those illustrated in FIG. 2. For example, the memory 205 may include an operating system, fraud prevention software, and other suitable software. Additionally, the functionality described herein as being performed by one of the components included in the memory 205 may be performed by a different component in the memory 205 or distributed amongst a plurality of components included in the memory 205.

Figure 3:
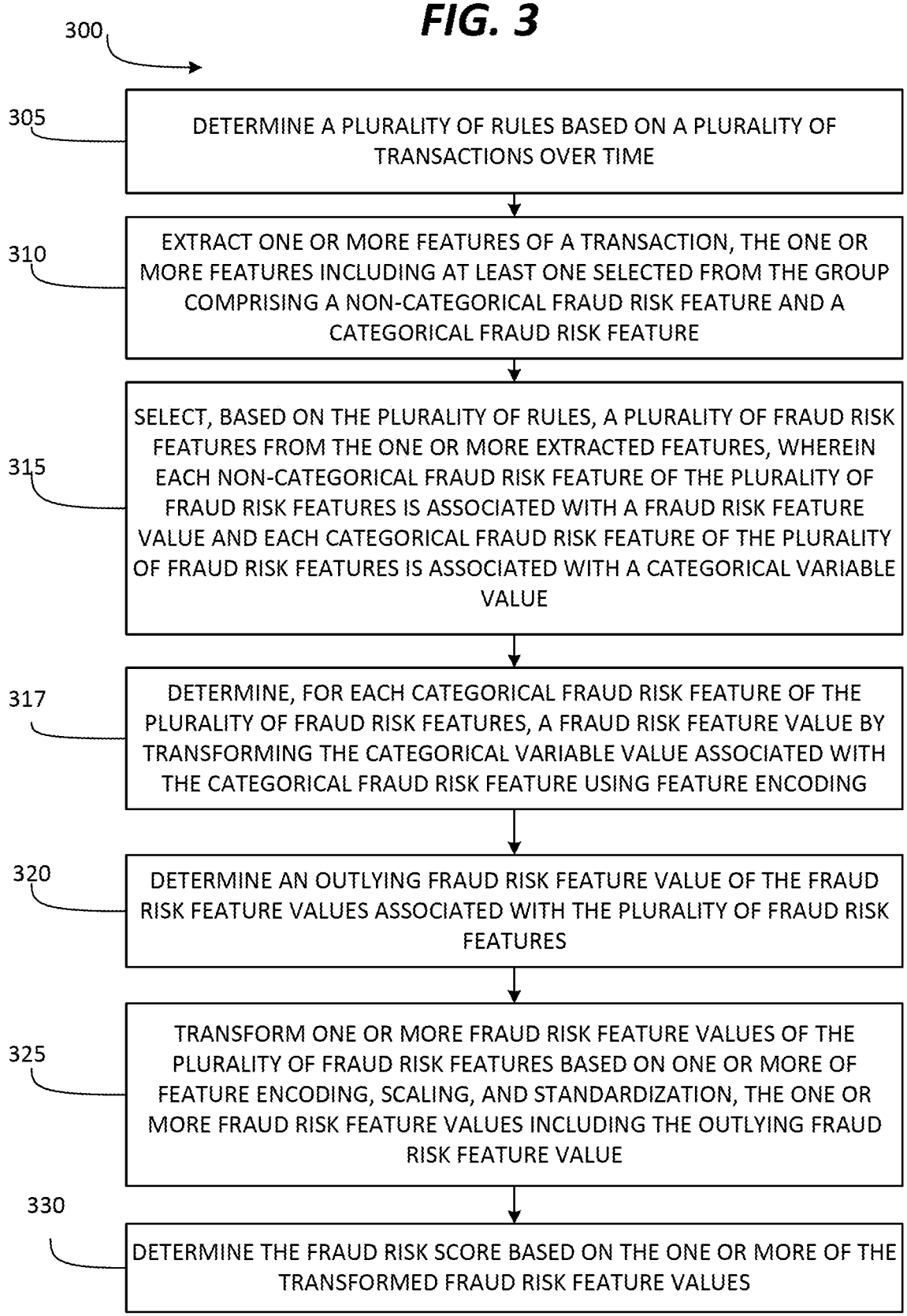
FIG. 3 is a flow chart of a method of determining a fraud risk score associated with a transaction in accordance with some embodiments.

FIG. 3 illustrates an example method 300 for determining a fraud risk score associated with a transaction. At step 305, when the electronic processor 200 executes the anomaly detector software 215, the electronic processor 200 analyzes a plurality of transactions and determines, for example, a plurality of anchor rules, a plurality of traffic rules, and/or other suitable rules. A traffic rule is a rule pertaining to a user's traffic with respect to a transaction. A traffic rule is, for example, a rule suggesting that a user initializing a transaction is masking their connection information with a proxy. Another example of a traffic rule may be "connection type" which determines whether the user has a consumer satellite connection, a mobile wireless connection, a fixed wireless connection, or other suitable connection. Additional examples of a traffic rule may be connection speed (e.g., a low connection speed, a medium connection, or a high connection speed) and hosting facility (Boolean) that may indicate whether the IP is associated with a facility that provides storage, computing, or telecommunication services.

An anchor is associated with an entity involved a transaction. Usually, an anchor is an identifier of a physical or digital entity. An anchor is, for example, an IP address, an account, a latitude and longitude, or other suitable entity. An anchor rule determines a measurement associated with an anchor over time. For example, an anchor rule may determine how much of the activity observed against a specific anchor has been labeled as suspect, associated with a high-risk score, or known to be fraudulent. One example of an anchor rule is the proportion of transactions that were identified as high-risk for each IP address. An anchor rule may be based on plurality of past transactions and past risk scores. It should be understood that the outputs (anchor rules, traffic rules, other suitable rules, or a combination thereof) of the anomaly detector software 215 are updated continuously by the electronic processor 200 as transactions are performed.

Unlike when executing the anomaly detector software 215, when executing the feature generator software 220, the electronic processor 200 only processes data regarding a transaction (for example, a transaction initiated by the first user device 105) when a fraud risk score is being determined for the transaction. Specifically, at step 310, the electronic processor 200, when executing the feature generator software 220, extracts a plurality of features associated with the transaction for which a fraud risk score is being determined. The features that are extracted include categorical and non-categorical features. Examples of categorical features include a zip code from which the transaction was initiated, a country from which the transaction was initiated, a state from which the transaction was initiated, an internet service provider (ISP) via which the transaction was initiated, and the like. Examples of non-categorical features include a number of days that have passed since the account associated with the transaction was last logged into, whether the funds destination associated with the transaction is a destination to which funds in the account associated with the transaction have previously been sent, the login success ratio of a decentralized identifier (DID) of an entity (for example, the first user device 105) initiating the transaction (for example, the number of successful attempts to login to the account associated with the transaction that the entity associated with the DID has made over a predetermined amount of time compared to the number of unsuccessful attempts to login to the account associated with the transaction that the entity associated with the DID has made over the predetermined amount of time), whether the transaction is being initiated by the mobile device, and the like.

At step 315, when the electronic processor 200 executes the feature transformer software 225, the electronic processor 200 selects a plurality of fraud risk features (including categorical and non-categorical fraud risk features) from the one or more extracted features.

In some embodiments, when executing the feature transformer software 225, the electronic processor 200 selects a plurality of fraud risk features that are important to determining whether or not a transaction is fraudulent from the one or more extracted features based on the rules output by the anomaly detector software 215. For example, if an anchor rule indicates that the percentage of activity labeled as suspect, associated with a high-risk score, or known to be fraudulent remains relatively constant across IP addresses, the IP address of a user device initiating the transaction are not important to determining whether or not a transaction is fraudulent and may not be a feature selected by the electronic processor 200. In another example, if an anchor rule indicates that the percentage of activity labeled as suspect, associated with a high-risk score, or known to be fraudulent varies greatly depending on the geographical location, geographical location is important to determining whether or not a transaction is fraudulent and may be a feature selected by the electronic processor 200. In some embodiments, the electronic processor 200 selects a plurality of fraud risk features that are important to determining whether or not a transaction is fraudulent from the one or more extracted features using feature selection techniques such as recursive feature elimination cross validation (RFECV) or least absolute shrinkage and selection operator (LASSO). In other embodiments, a clustering algorithm may be used to select features that are important to determining whether or not a transaction is fraudulent. In some embodiments, a feature is considered important when a value associated with the feature is likely indicative of whether a transaction is fraudulent.

Each non-categorical fraud risk feature of the plurality of fraud risk features that the electronic processor 200 selects is associated with a fraud risk feature value for each of the plurality of fraud risk features. A fraud risk feature value is indicative of the level of fraud risk presented by the feature that the fraud risk feature value is associated with. Each categorical fraud risk feature of the plurality of fraud risk features selected by the electronic processor 200 is associated with a categorical variable value.

In some embodiments, at step 317, the electronic processor 200 determines, for each categorical fraud risk feature of the plurality of fraud risk features, a fraud risk feature value by transforming the categorical variable value associated with the categorical fraud risk feature using feature encoding (for example, one hot encoding or target encoding).

In some embodiments, the electronic processor 200, when executing the feature transformer software 225, performs feature encoding for categorical fraud risk features to ensure that the machine learning software 230 is able to utilize categorical fraud risk features. A categorical fraud risk feature is a feature for which there are a predetermined number of variables. For example, the categorical fraud risk feature country has a plurality of countries (for example, the United States, Mexico, Canada) which are categorical variable values. Feature encoding is a variant of labeling encoding that does not require ground truth knowledge. Feature encoding includes calculating, for a categorical variable value, an associated average fraud risk feature value. Feature encoding includes calculating an initial average fraud risk feature value for a categorical variable value (for example, the United States) (fraud_risk_for_categorical_variable_value), determining a number of times each categorical variable value was seen (for example, how many transactions has a categorical variable value been included in during a predetermined amount of time) (count_of_times_seen), and calculating an average fraud risk feature value across the entire population of transaction records over a predetermined amount of time (population_average_fraud_risk).

To better model categorical variable values for which there is limited data (categorical variable values that have been seen very few times), feature encoding includes adjusting the initial average fraud risk feature value for a categorical variable value based on the number of times a categorical variable value is seen and the average fraud risk feature value determined for the entire population of transaction records. The following is an example of the calculations performed as a part of the feature encoding to adjust the initial average fraud risk feature value for a categorical variable value. First a smoothing value is calculated based on the number of times the categorical variable value was seen using the following equation: smoothing_value=1/(1+exp(−(count_of_times_seen−1)/1)). Next, an adjusted categorical variable value is calculated using the smoothing value, the initial average fraud risk feature value for the categorical variable value, the number of times the categorical variable value is seen, and the average fraud risk feature value determined for the entire population of transaction records in the following equation: adjusted_fraud_risk_feature_value=population_average_fraud_risk*(1−smoothing_value)+fraud_risk_for_categorical_variable_value*smoothing_value.

In some embodiments, random noise is added to the average fraud risk values calculated for the categorical variable value to prevent overfitting.

In some embodiments, the electronic processor 200 determines a reliability metric for each feature. A reliability metric indicates how accurately fraud risk can be determined based on a feature. In some embodiments, a fraud risk feature value is determined for a feature using a range of historical and reputational indicator measures into measures that are indicative of the level of fraud risk presented by a feature.

In some embodiments, at step 320, the electronic processor 200, when executing the feature transformer software 225, determines an outlying fraud risk feature value of the fraud risk feature values associated with the plurality of fraud risk features. In some embodiments, the electronic processor 200 tags the one or more outlying fraud risk feature values by applying an outlier detection technique (for example, zscore or isolation forest). In other embodiments, the electronic processor 200 rescales (transforms) the one or more outlying fraud risk feature values using log-scaling, or by raising the one or more outlying fraud risk feature values to a power (for example, the power of two) and then calculating the square root. In other embodiments, the electronic processor 200 sets outlying fraud risk feature values to zero or an average value (for example, an average fraud risk feature value determined for a specific feature for a plurality of transactions over time).

At step 325, the electronic processor 200, executing the feature transformer software 225, transforms one or more fraud risk feature values of the plurality of fraud risk features based on one or more of feature encoding, scaling, and standardization or normalization, the one or more fraud risk feature values including the outlying fraud risk feature value.

In some embodiments, the electronic processor 200, when executing the feature transformer software 225, scales fraud risk feature values of the selected fraud risk features. For example, the electronic processor 200 scales the fraud risk feature values to conform to a scale of 0 to 1, a logarithmic scale, or other suitable scale.

In some embodiments, the electronic processor 200, when executing the feature transformer software 225, standardizes fraud risk feature values. For example, the electronic processor 200 scales the fraud risk feature values based on the standard deviation of the fraud risk feature values to fit into a Gaussian distribution.

In some embodiments, the electronic processor 200, when executing the feature transformer software 225, calculates and outputs performance measures related to the functionality of feature transformation, including feature importance information.

In some embodiments, the machine learning software 230 is a gradient boosted trees algorithm. Specifically, the machine learning software 230 may be a XGBoost (eXtreme Gradient Boosting tree) algorithm. While described herein as a gradient boosted trees algorithm, in some embodiments, the machine learning software 230 is, for example, a decision tree, an artificial neural network, a support vector machine, clustering algorithm, a Bayesian network, or other suitable machine learning software.

At step 330, the electronic processor 200, when executing the machine learning software 230, determines a value between 0 and 1 which represents the likelihood that a transaction is fraudulent (a fraud risk score) based on the one or more of the transformed fraud risk feature values. For example, when a first feature first_time_dest_acct has a fraud risk feature value of one (indicating the transaction includes sending money from an account to a destination that the account has never sent funds to before) and a second feature num_add_recipient_in_session has a fraud risk feature value greater than five (indicating that more than five recipients or destinations have been associated with an account since the account was last logged into), the fraud risk score generated when the electronic processor 200 executes the machine learning software 230 is 0.9. In some examples, one or more predetermined thresholds are included in the memory 205 of the server 125 and the fraud risk score is compared to the one of more predetermined thresholds to classify the transaction as, for example, high risk or low risk. In some embodiments, comparing the fraud risk score to the one of more predetermined thresholds allows the electronic processor 200 to determine a further action to take in response to the transaction. For example, in some embodiments, when the fraud risk score is above a predetermined threshold (for example, 0.8), the further action the electronic processor 200 takes is to block the transaction. In other embodiments, when the fraud risk score is above a predetermined threshold (for example, 0.8), the further action the electronic processor 200 takes is to send a completely automated public Turing test to tell computers and humans apart (CAPTCHA), one or more security questions, a request for multi-factor authentication, a combination of the foregoing, or the like to the user device (for example, the first user device 105) that initiated the transaction. In some embodiments, the fraud risk score is displayed on the user interface 130.

In some embodiments, in addition to generating a fraud risk score the electronic processor 200 sets one or more flags based on the fraud risk feature data received by machine learning software 230. Fraud risk features that have associated flags are fraud risk features which have a high impact on the fraud risk score output by the electronic processor 200, when executing the machine learning software 230. As described above, fraud risk features that are important to determining the fraud risk score or have a high impact on the fraud risk score may be selected by the feature transformer software 225. In one example, the electronic processor 200 is configured to set a flags associated with the following features: Days_since_last_session_sendfunds, Dfp_change_from_prev_session, Rs_ipsld_mean, Rs_rtt, and dist_to_time_ratio. dist_to_time_ratio is a measure of the geographical distance between a geographical location of a device initiating the transaction associated with an account and a geographical location of a device initiating a most recent transaction associated with the account. Rs_ipsld_mean is an internet protocol second-level domain of a transaction. Rs_rtt is a round trip time of a transaction. Days_since_last_session_sendfunds is the number of days since funds were last transferred from an account. Dfp_change_from_prev_session represents the change in device data quality since a device previously accessed an account. If the machine learning software 230 receives a transformed fraud risk feature value, the flag associated with a fraud risk feature of the transformed fraud risk feature value is set to one, otherwise the flag associated with the fraud risk feature is set to 0. For example, if the data associated with a fraud risk feature is of low quality (for example, unavailable, out of range, invalid, or the like) the flag associated with the fraud risk feature is set to 0. In some embodiments, in addition to displaying the fraud risk score, the user interface 130 also displays an indication of the fraud risk features whose associated flags were set to 0 when the fraud risk score was determined.

Figure 4:
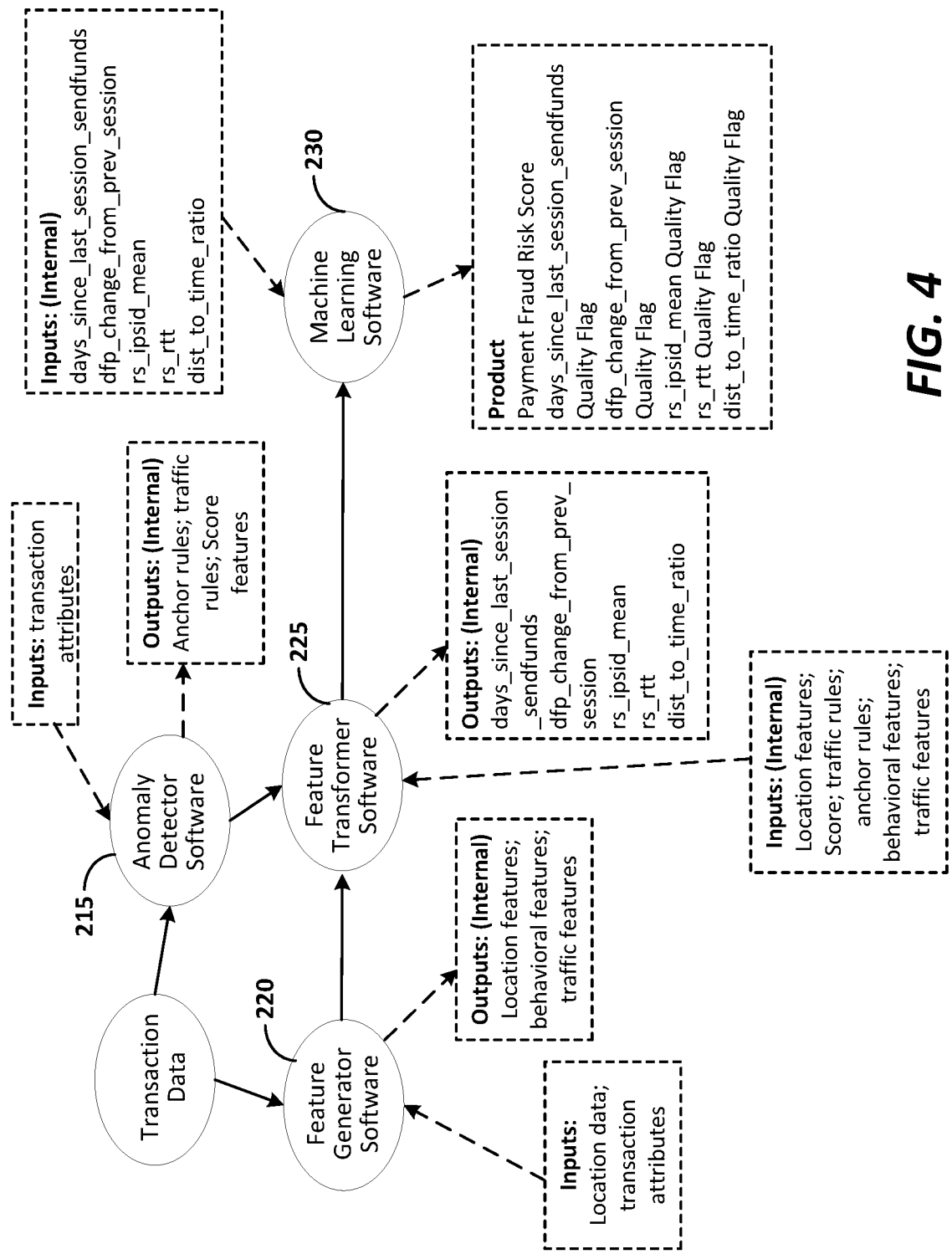
FIG. 4 is a flow chart of inputs and outputs generated by a plurality of software included in the memory of the server of FIG. 2 in accordance with some embodiments.

FIG. 4 illustrates an example of data input to and output by each of the anomaly detector software 215, feature generator software 220, feature transformer software 225, and machine learning software 230. It should be understood that the features (e.g., anomaly detection scores) output by the feature transformer software 225 in FIG. 4 are merely illustrative and the feature transformer software 225 may output different features than those illustrated in FIG. 4. Additionally, the feature transformer software 225 may output a different number of features than the number illustrated being output in FIG. 4.

In the example of FIG. 4, the anomaly detection scores may not directly impact the fraud risk scores but are used to identify anomalous observations prior to model development. An anomalous observation may be verified to confirm the anomalous observation is not erroneous. If the anomalous observation is erroneous, then the anomaly detection scores may be dropped from the model to ensure that these erroneous scores do not bias the model.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for determining a fraud risk score associated with a transaction, the system comprising:

a server including an electronic processor configured to:
continuously determine a plurality of rules based on a plurality of transactions over time, the plurality of rules including at least one of an anchor rule or a traffic rule,
extract a plurality of features of the transaction,
perform one or more parallelizable and tunable statistical functions in parallel with each other and in coordination with a subset of the plurality of rules that are continuously determined to select two or more fraud risk features from the plurality of features that are extracted, the subset being less than all of the plurality of rules,
wherein the two or more fraud risk features include one or more non-categorical fraud risk features and one or more categorical fraud risk features,
each of the one or more non-categorical fraud risk features of the plurality of fraud risk features is associated with a fraud risk feature value, and
each of the one or more categorical fraud risk features of the plurality of fraud risk features is associated with a categorical variable value,
determine, for the each of the one or more categorical fraud risk features of the plurality of fraud risk features, a transformed fraud risk feature value by transforming the categorical variable value associated with the one or more categorical fraud risk features using feature encoding,
determine an outlying fraud risk feature value from a plurality of fraud risk feature values,
wherein one or more fraud risk feature values and one or more transformed fraud risk feature values are part of the plurality of fraud risk feature values,
generate one or more second transformed fraud risk feature values by transforming one or more of the plurality of fraud risk feature values with one or more of feature encoding, scaling, and standardization, the plurality of fraud risk feature values including the outlying fraud risk feature value, and
determine the fraud risk score based on the one or more second transformed fraud risk feature values,
wherein the one or more parallelizable and tunable statistical functions include a number of elements that are tuned with machine learning, and
wherein the number of elements tuned by machine learning are tuned based on the fraud risk score.

2. The system according to claim 1, wherein the one or more parallelizable and tunable statistical functions include a feature selection technique or a clustering algorithm.

3. The system according to claim 1, wherein the electronic processor is configured to determine the fraud risk score based on the one or more second transformed fraud risk feature values by executing a Gradient Boosting tree algorithm to analyze the one or more second transformed fraud risk feature values and generate the fraud risk score.

4. The system according to claim 1, wherein the electronic processor is configured to flag fraud risk features that are associated with data that is at least one of unavailable, out of range, or invalid.

5. The system according to claim 1, wherein the traffic rule is a rule pertaining to a user's traffic with respect to the transaction and the anchor rule is a measurement of activity observed against a specific anchor that has been at least one selected from a group comprising:
labeled as suspect,
associated with a high-risk score, and
known to be fraudulent.

6. The system according to claim 1, wherein the electronic processor is further configured to compare the fraud risk score to a predetermined threshold, and perform an action based on the comparison of the fraud risk score to the predetermined threshold.

7. A method for determining a fraud risk score associated with a transaction, the method comprising:
continuously determining a plurality of rules based on a plurality of transactions over time, the plurality of rules including at least one of an anchor rule or a traffic rule,
extracting a plurality of features of the transaction,
performing one or more parallelizable and tunable statistical functions in parallel with each other and in coordination with a subset of the plurality of rules that are continuously determined to select two or more fraud risk features from the plurality of features that are extracted, the subset being less than all of the plurality of rules, wherein the plurality of fraud risk features include one or more non-categorical fraud risk features and one or more categorical fraud risk features,
each of the one or more non-categorical fraud risk features of the plurality of fraud risk features is associated with a fraud risk feature value, and
each of the one or more categorical fraud risk features of the plurality of fraud risk features is associated with a categorical variable value,
determining, for the each of the one or more categorical fraud risk features of the plurality of fraud risk features, a transformed fraud risk feature value by transforming the categorical variable value associated with the one or more categorical fraud risk features using feature encoding,
wherein one or more fraud risk feature values and one or more transformed fraud risk feature values are part of a plurality of fraud risk feature values,
determining an outlying fraud risk feature value from the plurality of fraud risk feature values,
generating one or more second transformed fraud risk feature values by transforming one or more of the plurality of fraud risk feature values with one or more of feature encoding, scaling, and standardization, the plurality of fraud risk feature values including the outlying fraud risk feature value, and
determining the fraud risk score based on the one or more second transformed fraud risk feature values,
wherein the one or more parallelizable and tunable statistical functions include a number of elements that are tuned with machine learning, and
wherein the number of elements tuned by machine learning are tuned based on the fraud risk score.

8. The method according to claim 7, wherein the one or more parallelizable and tunable statistical functions include a feature selection technique or a clustering algorithm.

9. The method according to claim 7, wherein determining the fraud risk score based on the one or more second transformed fraud risk feature values includes executing a Gradient Boosting tree algorithm to analyze the one or more second transformed fraud risk feature values and generate the fraud risk score.

10. The method according to claim 7, further comprising flagging fraud risk features that are associated with data that is at least one of unavailable, out of range, or invalid.

11. The method according to claim 7, wherein the traffic rule is a rule pertaining to a user's traffic with respect to the transaction and the anchor rule is a measurement of activity observed against a specific anchor that has been at least one selected from a group comprising:

labeled as suspect,
associated with a high-risk score, and
known to be fraudulent.

12. The method according to claim 7, further comprising:
comparing the fraud risk score to a predetermined threshold; and
performing an action based on the comparison of the fraud risk score to the predetermined threshold.

13. A non-transitory computer-readable medium with computer-executable instructions stored thereon that, when executed by an electronic processor, cause the electronic processor to perform a set of operations comprising:
continuously determining a plurality of rules based on a plurality of transactions over time, the plurality of rules including at least one of an anchor rule or a traffic rule,
extracting a plurality of features of a transaction,
performing one or more parallelizable and tunable statistical functions in parallel with each other and in coordination with a subset of the plurality of rules that are continuously determined to select two or more fraud risk features from the plurality of features that are extracted, the subset being less than all of the plurality of rules, wherein the plurality of fraud risk features include one or more non-categorical fraud risk features and one or more categorical fraud risk features,
each of the one or more non-categorical fraud risk features of the plurality of fraud risk features is associated with a fraud risk feature value, and
each of the one or more categorical fraud risk features of the plurality of fraud risk features is associated with a categorical variable value,
determining, for the each of the one or more categorical fraud risk features of the plurality of fraud risk features, a transformed fraud risk feature value by transforming the categorical variable value associated with the one or more categorical fraud risk features using feature encoding,
wherein one or more fraud risk feature values and one or more transformed fraud risk feature values are part of a plurality of fraud risk feature values,
determining an outlying fraud risk feature value from the plurality of fraud risk feature values,
generating one or more second transformed fraud risk feature values by transforming one or more of the plurality of fraud risk feature values with one or more of feature encoding, scaling, and standardization, the plurality of fraud risk feature values including the outlying fraud risk feature value, and
determining a fraud risk score based on the one or more second transformed fraud risk feature values,
wherein the one or more parallelizable and tunable statistical functions include a number of elements that are tuned with machine learning, and
wherein the number of elements tuned by machine learning are tuned based on the fraud risk score.

14. The non-transitory computer-readable medium according to claim 13, wherein the one or more parallelizable and tunable statistical functions include a feature selection technique or a clustering algorithm.

15. The non-transitory computer-readable medium according to claim 13, wherein determining the fraud risk score based on the one or more second transformed fraud risk feature values includes executing a Gradient Boosting tree algorithm to analyze the one or more second transformed fraud risk feature values and generate the fraud risk score.

16. The non-transitory computer-readable medium according to claim 13, wherein the set of operations further includes flagging fraud risk features that are associated with data that is at least one of unavailable, out of range, or invalid.

17. The non-transitory computer-readable medium according to claim 13, wherein the traffic rule is a rule pertaining to a user's traffic with respect to the transaction and the anchor rule is a measurement of activity observed against a specific anchor that has been at least one selected from a group comprising:
labeled as suspect,
associated with a high-risk score, and
known to be fraudulent.

18. The non-transitory computer-readable medium according to claim 13, wherein the set of operations further includes
comparing the fraud risk score to a predetermined threshold, and
perform an action based on the comparison of the fraud risk score to the predetermined threshold.

* * * * *